(12) United States Patent
Wang et al.

(10) Patent No.: US 11,929,873 B1
(45) Date of Patent: Mar. 12, 2024

(54) OPC UA-BASED CENTRALIZED USER CONFIGURATION METHOD AND SYSTEM FOR TIME-SENSITIVE NETWORK

(71) Applicant: INSTITUTE OF INDUSTRIAL INTERNET, CHONGQING UNIVERSITY OF POSTS AND TELECOMMUNICATIONS, Chongqing (CN)

(72) Inventors: Ping Wang, Chongqing (CN); Chenggen Pu, Chongqing (CN); Yi Wang, Chongqing (CN); Yifu Yang, Chongqing (CN); Fanchuan Zeng, Chongqing (CN)

(73) Assignee: INSTITUTE OF INDUSTRIAL INTERNET, CHONQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/500,024

(22) Filed: Nov. 1, 2023

Related U.S. Application Data

(63) Continuation of application No. PCT/CN2022/091493, filed on May 7, 2022.

(30) Foreign Application Priority Data

Jun. 18, 2021 (CN) .......................... 202110678514.2

(51) Int. Cl.
*H04L 41/0806* (2022.01)
*H04L 41/12* (2022.01)
*H04L 47/80* (2022.01)
*H04L 67/51* (2022.01)

(52) U.S. Cl.
CPC .......... *H04L 41/0806* (2013.01); *H04L 41/12* (2013.01); *H04L 47/801* (2013.01); *H04L 67/51* (2022.05)

(58) Field of Classification Search
CPC ..... H04L 41/0806; H04L 41/12; H04L 67/51; H04L 47/801
See application file for complete search history.

(56) References Cited

PUBLICATIONS

Practical Implementation of an OPC UA TSN Communication Architecture for a Manufacturering System, Yuting Li IEEE Aeeess Nov. 3, 2020, Refer to Section III-VI, Figures 1-4.6.8; Department of Electronic Engineering, Hanyang Universty, Ansan 15588, South Korea.

*Primary Examiner* — Blake J Rubin

(57) ABSTRACT

Disclosed is an OPC UA-based centralized user configuration method and system for a time-sensitive network. The system includes user terminal stations, a UA-TSN configuration management middleware and a centralized user configuration entity. The user terminal station includes a plurality of field devices and a UA-TSN coordinator; the UA-TSN configuration management middleware obtains an OPC UA address information list by accessing the UA-TSN coordinator; and the centralized user configuration entity extracts and analyzes TSN stream demand information aggregated in the UA-TSN configuration management middleware. According to the present disclosure, the automatic transmission and configuration of TSN network scheduling information are realized, and the operation complexity in the large-scale TSN network configuration process is reduced.

8 Claims, 12 Drawing Sheets

Create a second OPC UA server for a user device discovery module, initialize the configuration, perform mDNS service, set an application type and URL information of the second OPC UA server, randomly allocate a server port number, and add server information — 301

Start the second OPC UA server, wait for LDS multicast discovery, and call a corresponding callback function when other new LDS-ME discovery server is discovered through mDNS multicast, to obtain URL information and port information of the new LDS-ME discovery server — 302

Check whether the new LDS-ME discovery server supports signature and encryption, call a function to generate a corresponding second registration client, connect the second OPC UA server to the new LDS-ME discovery server, and register, by the second OPC UA server, with the new LDS-ME discovery server — 303

FIG. 7

OPC UA-BASED CENTRALIZED USER CONFIGURATION METHOD AND SYSTEM FOR TIME-SENSITIVE NETWORK

CROSS-REFERENCE TO RELATED APPLICATIONS

This application is a continuation of PCT/CN2022/091493, filed May 7, 2022 and claims priority of Chinese Patent Application No. 202110678514.2, filed on Jun. 18, 2021, the entire contents of which are incorporated herein by reference.

TECHNICAL FIELD

The present disclosure belongs to the technical field of industrial communication, and relates to an OPC UA-based centralized user configuration method and system for a time-sensitive network.

BACKGROUND

As the information transformation of Industry 4.0 develops further, the demand for real-time and interoperability of data communication in industrial manufacturing systems are growing. The time-sensitive network (TSN), a set of standards supporting real-time data transmission, has characteristics of low delay, low jitter and extremely low packet loss probability, which can provide deterministic communication guarantee for industrial applications, and the configuration of time-sensitive mechanism is the key to the comprehensive deployment and integration of time-sensitive network. However, for a current large-scale industrial production system, the configuration process of TSN network is relatively complicated and highly depends on manual configuration. There are some data communication obstacles among various industrial devices due to protocol consistency, which makes the configuration process of TSN network in the system lack standardization and interoperability. As a highly standardized data communication specification, the open platform communications unified architecture (OPC UA) has the ability of unified description of device information and cross-platform data exchange. With the continuous advancement of industrial Internet technology, OPC UA has been widely recognized and popularized in the field of industrial automation production. The combination of OPC UA and TSN can not only give full play to the advantages of OPC UA in semantic interoperability, but also bring more efficient and standardized data communication ways to industrial systems with the help of the network characteristics of TSN.

At present, although the technology integrating OPC UA and TSN has emerged, the integration degree between OPC UA and TSN is relatively low. Therefore, there is an urgent need for a method for applying OPC UA to TSN network in a large-scale application scenario, configuring batch TSN streams in a standardized way, and realizing the automatic discovery of user devices in a TSN network and effective transmission and configuration of scheduling information.

SUMMARY

In view of the above background, an object of the present disclosure is to provide an OPC UA-based centralized user configuration method and system for a time-sensitive network. By applying OPC UA to the user side of TSN network scheduling configuration, the functions of automatic user discovery of a TSN network, multi-protocol data aggregation, transmission and configuration of network scheduling demand parameters are achieved.

In order to achieve the above object, the present disclosure provides the following technical solutions.

Ina first aspect of the present disclosure, the present disclosure provides an OPC UA-based centralized user configuration system for a time-sensitive network, at least including user terminal stations, a UA-TSN configuration management middleware and a centralized user configuration entity. The user terminal station includes field devices adopting different industrial protocols and a UA-TSN coordinator. The UA-TSN configuration management middleware obtains an OPC UA address information list by accessing the UA-TSN coordinator after embedded OPC UA servers of the field devices in the user terminal station actively register with the UA-TSN coordinator. The UA-TSN configuration management middleware communicates with the field devices in the user terminal station through corresponding OPC UA address information and collects device information. The centralized user configuration entity extracts and analyzes TSN stream demand information aggregated in the UA-TSN configuration management middleware, and the TSN stream demand information is scheduled and calculated to complete configuration.

Further, the UA-TSN configuration management middleware includes a data management module, a data distribution and control module, a user data aggregation module and a user device discovery module. The data management module is configured to store the data information in the system and save the data information in a local database, the data distribution and control module is configured to distribute and control the OPC UA address information list, the TSN stream demand information and a scheduling result information table, the user data aggregation module is configured to connect the field devices and aggregate all device data into the address spaces of the servers, and the user device discovery module is configured to establish the connection to the discovery server in the UA-TSN coordinator and obtain the OPC UA address information list of the field devices.

Further, the centralized user configuration entity includes an OPC UA client, a TSN scheduling control module, a management module and a communication interface. The OPC UA client is configured to communicate with the UA-TSN configuration management middleware to obtain integrated TSN stream demand information, the TSN scheduling control module is configured for the control of data stream transmission and configuration process, the management module is configured for information management, and the communication interface is configured to ensure the data interaction between the centralized user configuration entity and other external entities.

Further, the management module includes a configuration state management unit, a user resource management unit and a network topology management unit. The user resource management unit and the network topology management unit are configured to manage the obtained corresponding information of TSN user stream demands, and the configuration state management unit is configured to distribute TSN user communication configuration results returned from the other external entities.

In a second aspect of the present disclosure, the present disclosure also provides an OPC UA-based centralized user configuration system for a time-sensitive network, at least including user terminal stations, a UA-TSN configuration management middleware, a centralized user configuration entity and a centralized network configuration entity. The user terminal station includes field devices adopting different industrial protocols and a UA-TSN coordinator. The UA-TSN configuration management middleware obtains an OPC UA address information list by accessing the UA-TSN coordinator after embedded OPC UA servers of the field devices in the user terminal station actively register with the UA-TSN coordinator, the UA-TSN configuration management middleware communicates with the field devices in the user terminal station through corresponding OPC UA address information and collects device information, the centralized user configuration entity extracts and analyzes TSN stream demand information in the UA-TSN configuration management middleware, and the TSN stream demand information is transmitted to the centralized network configuration entity for scheduling calculation to complete configuration.

Ina third aspect of the present disclosure, the present disclosure provides an OPC UA-based centralized user configuration method for a time-sensitive network, including the following steps:

obtaining, by embedded OPC UA servers of field devices in a user terminal station, data information of the field devices in real time, and constructing an OPC UA information model of a TSN network, actively registering, by the embedded OPC UA servers, with a UA-TSN coordinator of the user terminal station, and storing address information of the servers in the UA-TSN coordinator, communicating, by a UA-TSN configuration management middleware, with the UA-TSN coordinator to discover and obtain an address information list of all registered embedded OPC UA servers in the user terminal station, connecting the UA-TSN configuration management middleware to the field devices in the user terminal station according to the address information list, reading data information in the embedded OPC UA servers, and uniformly collecting and managing all obtained data information, and completing the initialization by OPC UA clients in a centralized user configuration entity, then issuing a connection establishment request to a UA-TSN message broker middleware, reading TSN stream demands and network topology information stored in a user data aggregation module, and processing the read information.

Further, the constructing an OPC UA information model of a TSN network includes constructing a static data information model according to predefined XML format documents or preset programs or/and binding the embedded OPC UA servers with real-time data source of the field devices, and calling a predefined function to write new data values to construct a dynamic data information model when real-time data source information changes dynamically.

Further, the process of the actively registering, by the embedded OPC UA servers, with a UA-TSN coordinator of the user terminal station includes the following steps:

creating embedded OPC UA servers according to first registration information required by the embedded OPC UA servers, and initializing the configuration, defining an analytic function and a reading and writing method of data source information, and constructing address spaces of the embedded OPC UA servers according to the reading and writing method of data source information, calling the analytic function to process data, and adding the processed data information to nodes corresponding to the address spaces of the OPC UA servers, staring the embedded OPC UA servers to collect data information of the field devices, and calling the analytic function to obtain dynamic data of the field devices, creating a first registration client and initializing the configuration of the first registration client, and starting the first registration client to query an LDS-ME discovery server in the UA-TSN coordinator, and completing, by the embedded OPC UA, registration in the LDS-ME discovery server after the first registration client queries the LDS-ME discovery server.

Further, the communication between the UA-TSN configuration management middleware and the UA-TSN coordinator is that the communication between the UA-TSN configuration management middleware and the LDS-ME discovery server in the UA-TSN coordinator through a user device discovery module. The discovery process between the user device discovery module and the LDS-ME discovery server includes the following steps:

creating a second OPC UA server for the user device discovery module, initializing the configuration, performing mDNS service, setting an application type and URL information of the second OPC UA server, randomly allocating a server port number, and adding server information;

starting the second OPC UA server and waiting for LDS multicast discovery, and calling a corresponding callback function when other new LDS-ME discovery server is discovered through mDNS multicast, to obtain URL information and port information of the new LDS-ME discovery server; and checking whether the new LDS-ME discovery server supports signature and encryption, calling a function to generate a corresponding second registration client, connecting the second OPC UA server to the new LDS-ME discovery server, and registering, by the second OPC UA server, with the new LDS-ME discovery server.

Further, the UA-TSN configuration management middleware is connected to a plurality of field devices in the user terminal station and communicates with embedded OPC UA servers of a user device through the user data aggregation module. The communication process between the user data aggregation module and the embedded OPC UA servers includes the following steps:

creating and initializing a third OPC UA server in the user data aggregation module, and adding required nodes and references to address spaces of the third OPC UA server;

starting the third OPC UA server, and creating a new OPC UA client to call a corresponding callback function, to obtain an address information list of the embedded OPC UA servers of the user terminal station;

creating and initializing a plurality of OPC UA clients according to the obtained address information, connecting the OPC UA clients to corresponding embedded OPC UA servers according to URL address information, reading, by the OPC UA clients, data of the embedded OPC UA servers, and writing the data into the address spaces of the third OPC UA server; and interrupting the data interaction when the third OPC UA server receives a stop signal, disconnecting the communication connection between the OPC UA clients and the embedded OPC UA servers, and stopping the third OPC UA server and releasing the address spaces of the server.

In a fourth aspect of the present disclosure, the present disclosure also preferably provides an OPC UA-based centralized user configuration method for a time-sensitive network, including the following steps:

obtaining, by embedded OPC UA servers of industrial devices in a user terminal station, data information of the devices in real time, and constructing an OPC UA information model of a TSN network;

actively registering, by the embedded OPC UA servers, with a UA-TSN coordinator of the user terminal station, an LDS-ME discovery server in the coordinator storing address information of the registered OPC UA servers;

communicating, by a UA-TSN configuration management middleware, with the LDS-ME discovery server in the coordinator through a use device discovery module, to obtain an address information list of all registered embedded OPC UA servers;

connecting a user data aggregation module to the field devices in the user terminal station according to the obtained address information list, reading the data information in the address spaces of the embedded OPC UA servers, and uniformly collecting and managing all obtained data information;

completing the initialization by OPC UA clients in a centralized user configuration entity (CUC), then issuing a connection establishment request to a UA-TSN message broker middleware, reading TSN stream demands and network topology information stored in the user data aggregation module, further processing the read data information, and waiting for the calling of the centralized network configuration entity (CNC);

transmitting, by the CUC entity, the processed stream demand information to a CNC entity, starting to calculate, by the CNC entity, the TSN stream scheduling after the CUC entity issues a TSN stream scheduling calculation request, and returning scheduling request results (success or failure);

requesting, by the CUC entity, for the CNC entity to return the details of a calculated TSN scheduling result information table after the TSN stream scheduling calculation, the information containing key information of TSN network configuration, such as stream identifiers, transmission windows and end-to-end delay; and returning, by CUC, the obtained TSN stream scheduling result information table to the UA-TSN configuration management middleware, then transmitting the corresponding information to the field devices in the user terminal station, and performing, by the field devices, regularly sending and receiving operations of the data information according to the scheduling results.

The present disclosure has the following beneficial effects.

According to the present disclosure, a standardized, interoperable, safe and reliable data interaction scheme is provided for user-side scheduling configuration of a time-sensitive network in large-scale industrial automation production systems. That is, the automatic discovery and multi-protocol data aggregation of a TSN network user device are realized by OPC UA, the automatic transmission and configuration of the TSN network scheduling information are realized, and the operational complexity of the TSN network configuration process is reduced, which solves the problems of relatively complicated process of large-scale TSN stream configuration and strong dependence on manual configuration.

Other advantages, objects and features of the present disclosure will be set forth in the following description to some extent, and to some extent, it will be obvious to those skilled in the art based on the following investigation and study, or those skilled in the art may learn from the practice of the present disclosure. The objects and other advantages of the present disclosure can be realized and obtained by the following description.

BRIEF DESCRIPTION OF THE DRAWINGS

FIG. 7 is a flow chart of a user device discovery module according to an example of the present disclosure;

DETAILED DESCRIPTION

Technical solutions in the examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

Figure 1:
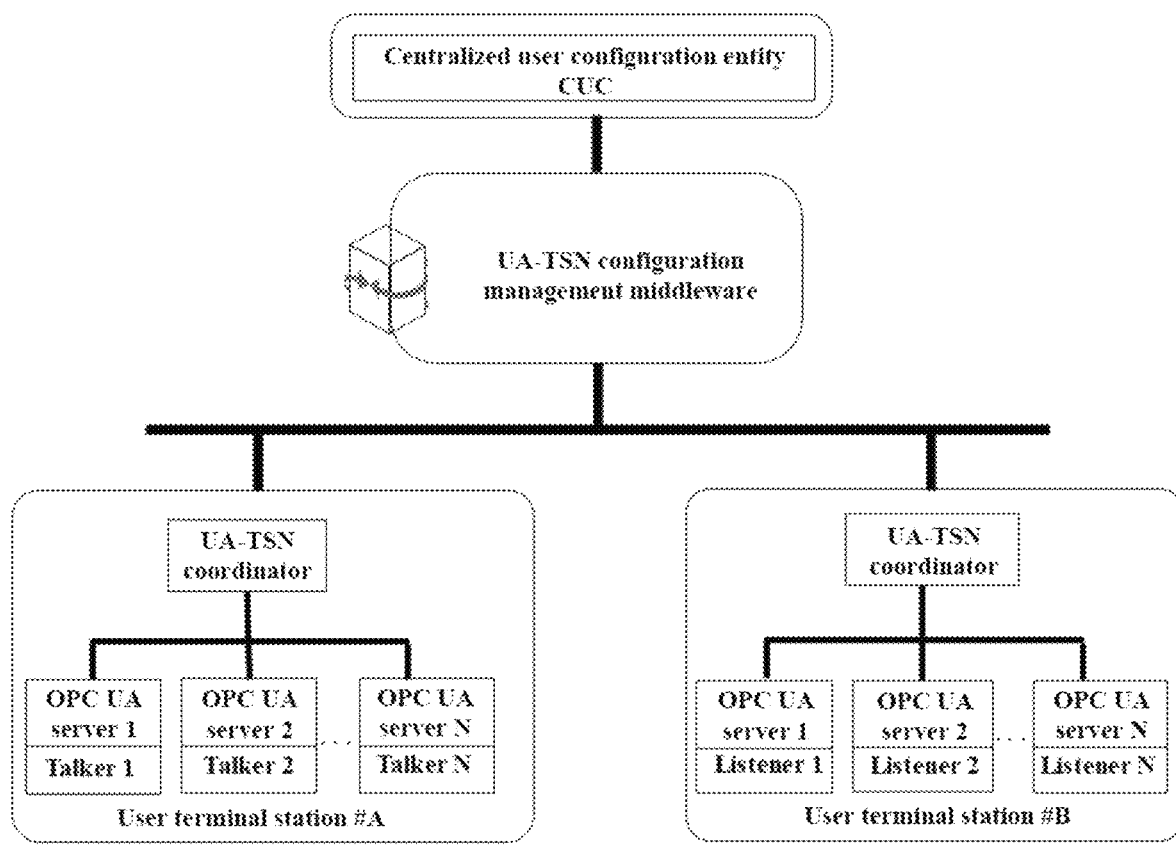
FIG. 1 is a system structure diagram of an OPC UA-based centralized user configuration method for a time-sensitive network according to one example of the present disclosure.

FIG. 1 is a system structure diagram of an OPC UA-based centralized user configuration method for a time-sensitive network according to one example of the present disclosure. As shown in FIG. 1, the user configuration system at least includes user terminal stations, a UA-TSN configuration management middleware and a centralized user configuration entity. The user terminal station includes field devices adopting different industrial protocols and a UA-TSN coordinator. The UA-TSN configuration management middleware obtains an OPC UA address information list by accessing the UA-TSN coordinator after embedded OPC UA servers of the field devices in the user terminal station actively register with the UA-TSN coordinator, the UA-TSN configuration management middleware communicates with the field devices in the user terminal station through corresponding OPC UA address information and collects device information, the centralized user configuration entity extracts and analyzes TSN stream demand information aggregated in the UA-TSN configuration management middleware, and the TSN stream demand information is scheduled and calculated to complete configuration.

Figure 2:
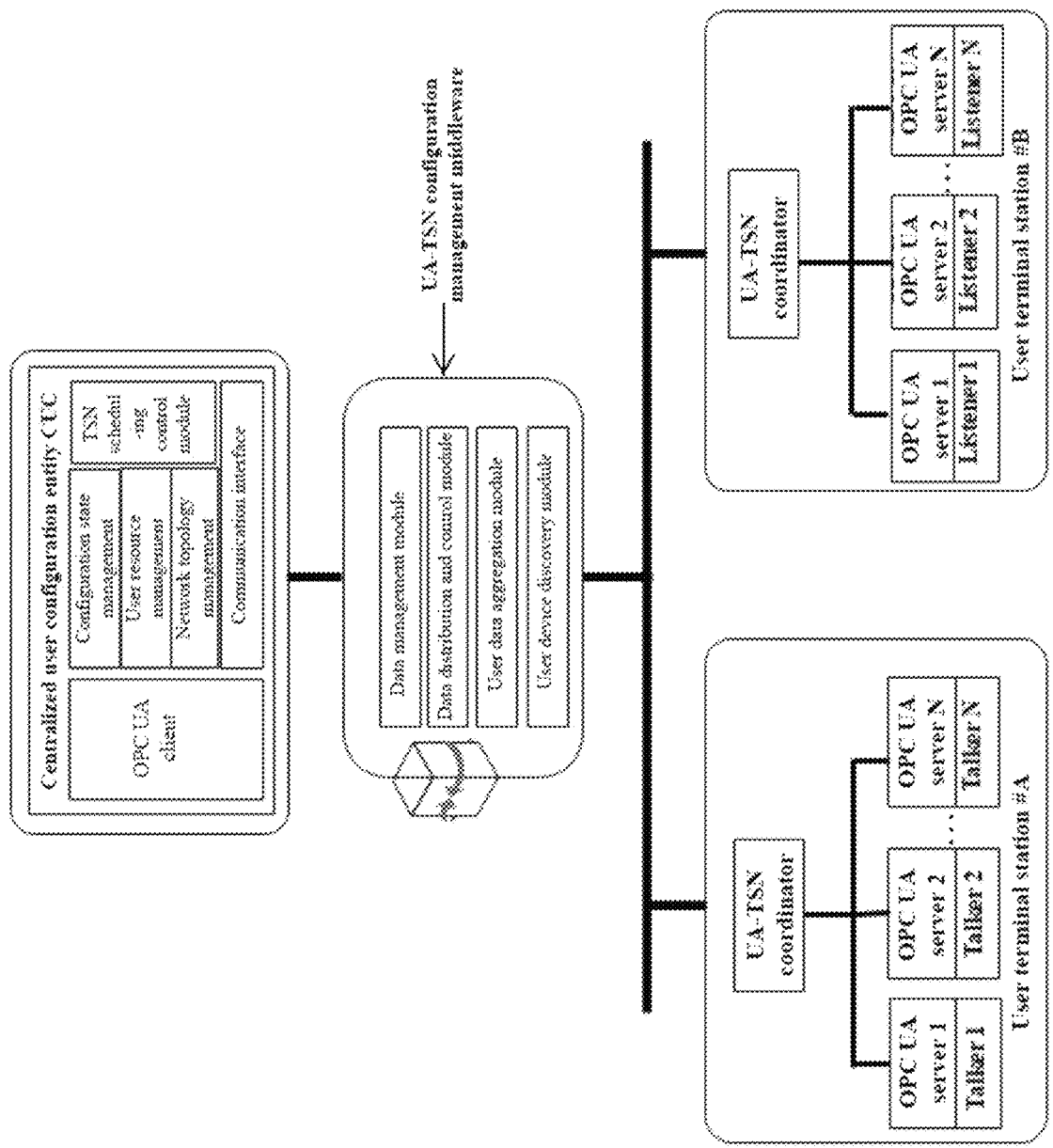
FIG. 2 is a structural diagram of an OPC UA-based centralized user configuration system for a time-sensitive network according to a preferred example of the present disclosure.

FIG. 2 is a structural diagram of an OPC UA-based centralized user configuration system for a time-sensitive network according to a preferred example of the present disclosure. As shown in FIG. 2, the user terminal station contains a variety of industrial field devices (Talker or Listener), and a separate embedded OPC UA server is contained in each field device. It can be understood that Talker or Listener here refers to an object attribute of a current field device as a sender or a receiver in the communication process, and is not a limitation on the attributes of the field device itself.

The functions of automatic discovery and data aggregation of user devices are realized by the UA-TSN configuration management middleware. The UA-TSN configuration management middleware includes a data management module, a data distribution and control module, a user data aggregation module and a user device discovery module. The data management module is realized by MySQL database, and is configured to store the data information in the system and save the data information in a local database to facilitate management for operators. The data distribution and control module is configured to distribute and control the OPC UA address information list, the TSN stream demand information and TSN stream scheduling result information. The user device discovery module, an LDS-ME discovery server, is configured to establish the connection to the discovery server in the UA-TSN coordinator and obtain the address information list of the field devices. The user data aggregation module is realized by an OPC UA aggregation server, and is configured to connect the field devices and aggregate all device data into the address spaces of the servers.

The centralized user configuration entity includes an OPC UA client, a TSN scheduling control module, a management module and a communication interface. The OPC UA client is configured to communicate with the UA-TSN configuration management middleware to obtain integrated TSN stream demand information. The TSN scheduling control module is configured for the control of data stream transmission and configuration process. The management module is configured for information management, that is, managing the obtained corresponding information of TSN user stream demands and managing and distributing TSN user communication configuration results returned from CNC. The communication interface is configured to ensure the data interaction between the centralized user configuration entity and other external entities, and the other external entities here can be a centralized network configuration entity CNC, an external web server and so on.

Furthermore, the management module includes a configuration state management unit, a user resource management unit and a network topology management unit. The user resource management unit and the network topology management unit are configured to manage the obtained corresponding information of TSN user stream demands, and the configuration state management unit is configured to distribute TSN user communication configuration results returned from the other external entities.

Figure 3:
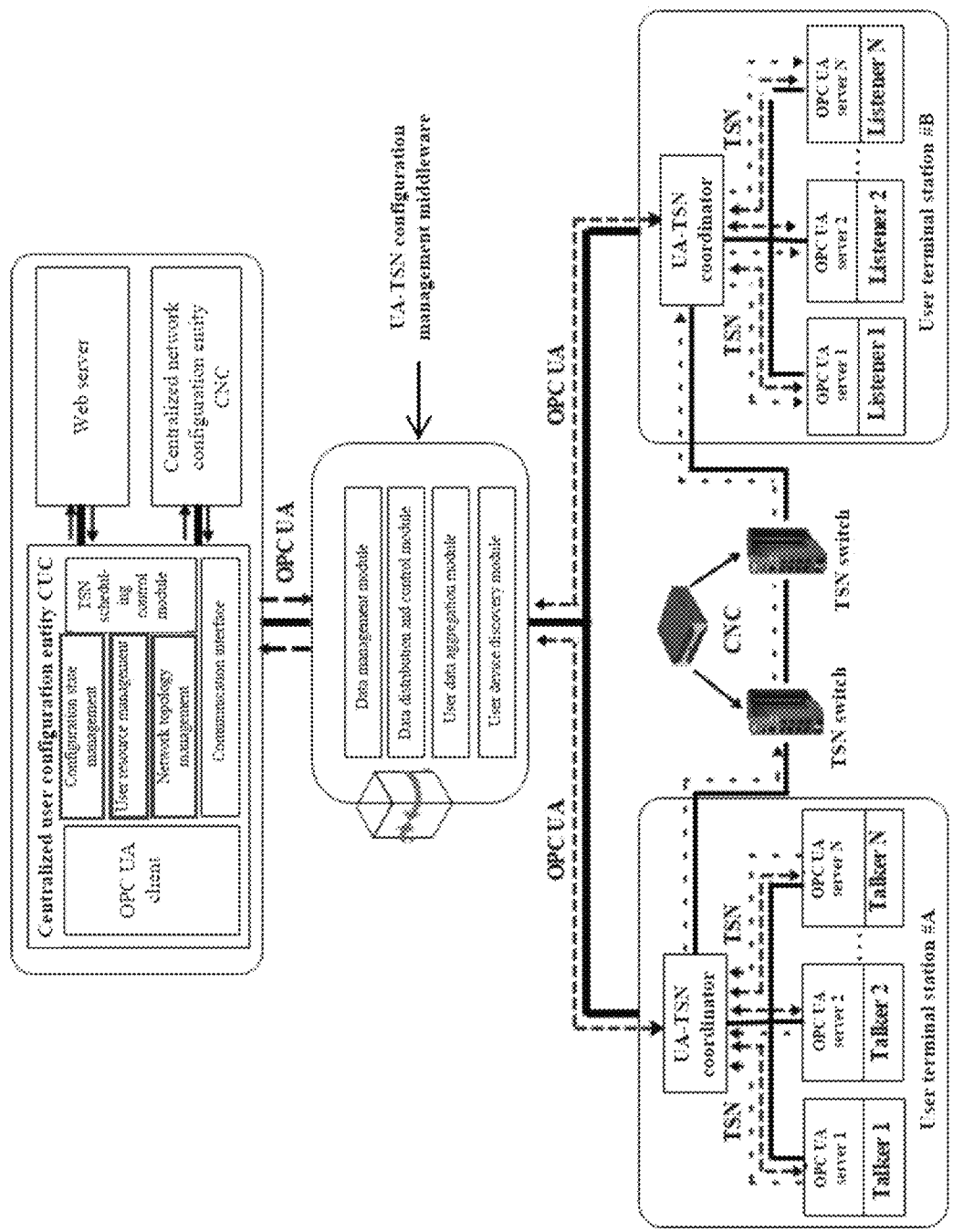
FIG. 3 is a structural diagram of the OPC UA-based centralized user configuration system for a time-sensitive network according to a more preferred example of the present disclosure.

FIG. 3 is a structural diagram of the OPC UA-based centralized user configuration system for a time-sensitive network according to a more preferred example of the present disclosure. As shown in FIG. 3, the user configuration system at least includes user terminal stations, a UA-TSN configuration management middleware, a centralized user configuration entity, a centralized network configuration entity, a web server and TSN switches. The user terminal station includes field devices adopting different industrial protocols and a UA-TSN coordinator. The UA-TSN configuration management middleware obtains an OPC UA address information list by accessing the UA-TSN coordinator after embedded OPC UA servers of the field devices in the user terminal station actively register with the UA-TSN coordinator. The UA-TSN configuration management middleware communicates with the field devices in the user terminal station through corresponding OPC UA address information and collects device information. The centralized user configuration entity can communicate with the web server through its communication interface, and extracts and analyzes TSN stream demand information in the UA-TSN configuration management middleware. The TSN stream demand information is transmitted to the centralized network configuration entity for scheduling calculation to complete configuration. The centralized network configuration entity returns a calculated TSN stream scheduling result information table to the centralized user configuration entity, and configures the TSN switches according to the scheduling result information table.

In an example of the present disclosure, taking the OPC UA-based centralized user configuration system for a time-sensitive network composed of two user terminal stations as an example, a user terminal station #A represents a sender's terminal station, and a user terminal station #B represents a receiver's terminal station. The user terminal station #A sends the generated device data from the embedded OPC UA servers in a form of TSN stream through its UA-TSN coordinator, which is connected to the TSN switch. The TSN switch transmits the TSN stream to a UA-TSN coordinator of user terminal station #B, and sends it to an embedded OPC UA server of the user terminal station #B through the UA-TSN coordinator.

It can be understood that there can be a plurality of user terminal stations in the present disclosure, and the above #A and #B are only used to distinguish data transmission directions. In fact, the user terminal station #A can also be used as a terminal station of the receiver, and the user terminal station #B can also be used as a terminal station of the sender. There can be N embedded OPC UAs in each user terminal station, and each embedded OPC UA server can correspond to a user, who can be a sender or a receiver.

In an example of the present disclosure, the communications between the centralized user configuration entity and the UA-TSN configuration management middleware, between the UA-TSN configuration management middleware and the user terminal station, and between the UA-TSN coordinator in the user terminal station and the embedded OPC UA servers all adopt an OPC UA protocol; and the communications between the centralized user configuration entity and the centralized network configuration entity, and between the centralized network configuration entity and the TSN switches all adopt a traditional network protocol, which is not specifically limited by the present disclosure.

Figure 4:
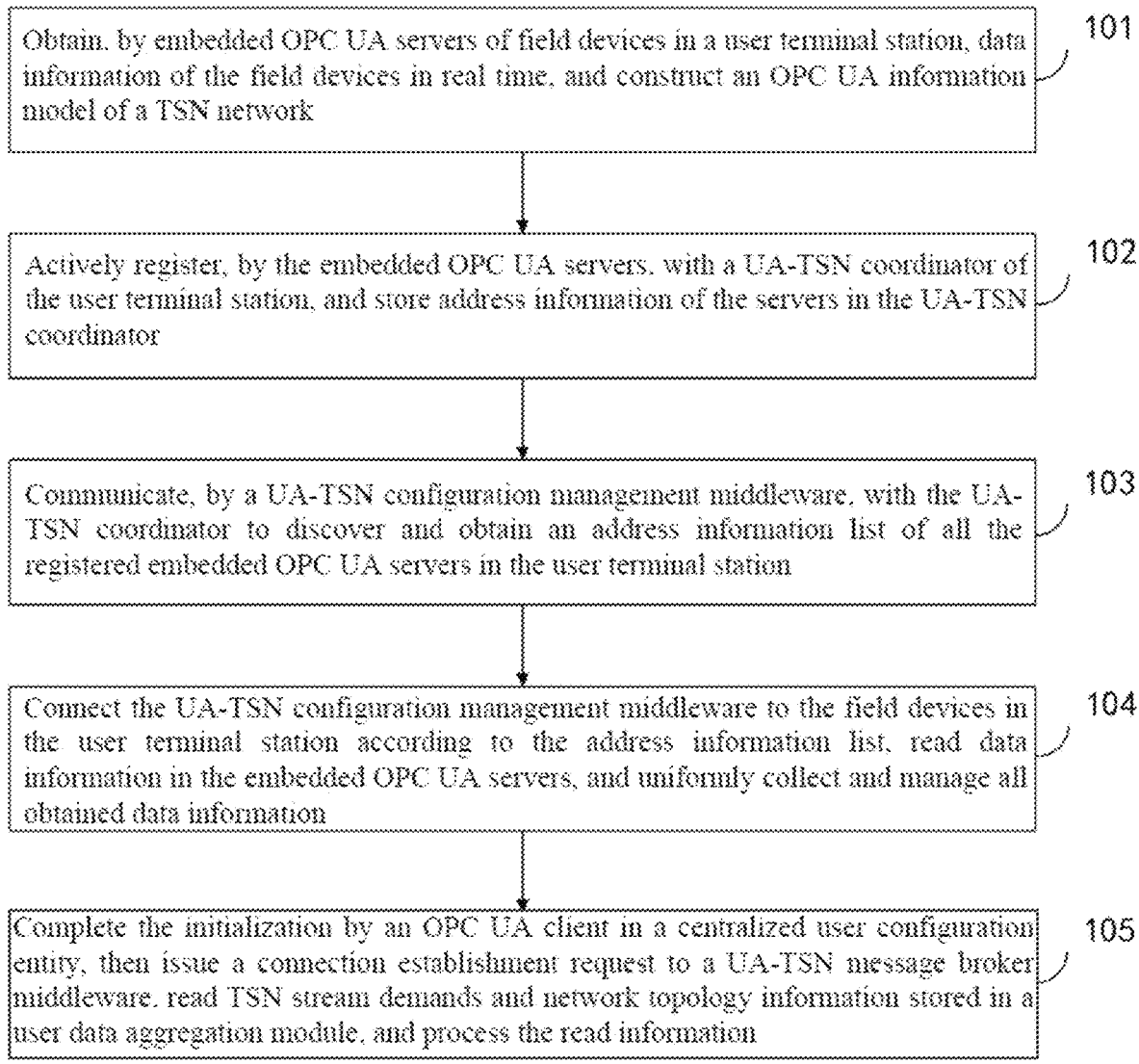
FIG. 4 is a flow chart of the OPC UA-based centralized user configuration method for a time-sensitive network according to an example of the present disclosure.

FIG. 4 is a flow chart of the OPC UA-based centralized user configuration method for a time-sensitive network according to an example of the present disclosure. As shown in FIG. 4, the method includes the following steps.

At 101: embedded OPC UA servers of field devices in a user terminal station obtain data information of the field devices in real time, and construct an OPC UA information model of a TSN network.

Data of the devices is obtained in real time by the embedded OPC UA servers of the field devices in the user terminal station, and the OPC UA information model is constructed in address spaces of the servers. Taking an embedded OPC UA server in a field device in a user terminal station 1 as an example, firstly, the embedded OPC UA server needs to collect user device data for information modeling. In the process of information modeling, the obtained data mainly contains two types of device information: static data and dynamic data. The information modeling of static data can be realized by programming or by introducing predefined XML documents. In the collection process of dynamic data, the embedded OPC UA server is bound with the real-time data source of user devices, and when the data source information changes dynamically, a predefined function is called to write new data values.

The construction of the OPC UA information model of a TSN network includes constructing a static data information model according to predefined XML format documents or preset programs or/and binding the embedded OPC UA server with a real-time data source of a field device, and when the real-time data source information changes dynamically, the predefined function is called to write new data values to construct a dynamic data information model.

At 102: the embedded OPC UA servers actively register with a UA-TSN coordinator of the user terminal station, and store address information of the registered OPC UA servers in the UA-TSN coordinator.

Figure 5:
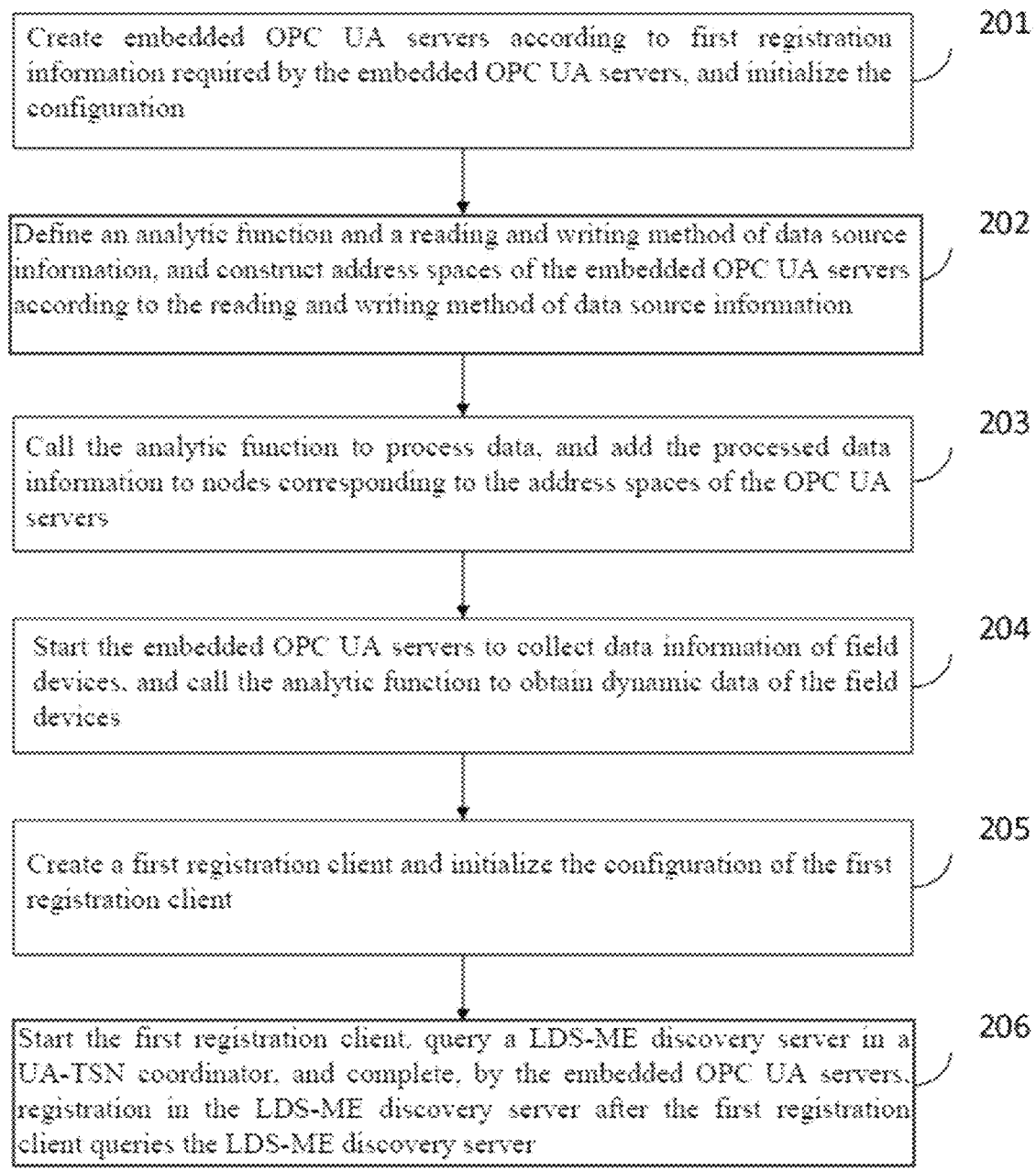
FIG. 5 is a registration flow chart of embedded OPC UA servers according to an example of the present disclosure.

FIG. 5 is a registration flow chart of embedded OPC UA servers according to an example of the present disclosure. As shown in FIG. 5, the embedded OPC UA servers actively register with the UA-TSN coordinator of the user terminal station includes the following steps.

At 201: embedded OPC UA servers are created according to first registration information required by the embedded OPC UA servers, and the configuration is initialized.

The first registration information includes basic information such as a communication protocol, a port number, a secure channel and session service of the server.

At 202: an analytic function and a reading and writing method of data source information are defined, and address spaces are constructed for the embedded OPC UA servers according to the reading and writing method of data source information.

At 203: the analytic function is called to process data, and the processed data information is added to nodes corresponding to the address spaces of the OPC UA servers.

At 204: the embedded OPC UA servers are started to collect data information of field devices, and the analytic function is called to obtain dynamic data of the field devices.

At 205: a first registration client is created and the configuration of the first registration client is initialized.

At 206: the first registration client is started to query an LDS-ME discovery server in a UA-TSN coordinator, and the embedded OPC UA servers complete registration in the LDS-ME discovery server after the first registration client queries the LDS-ME discovery server.

Figure 6:
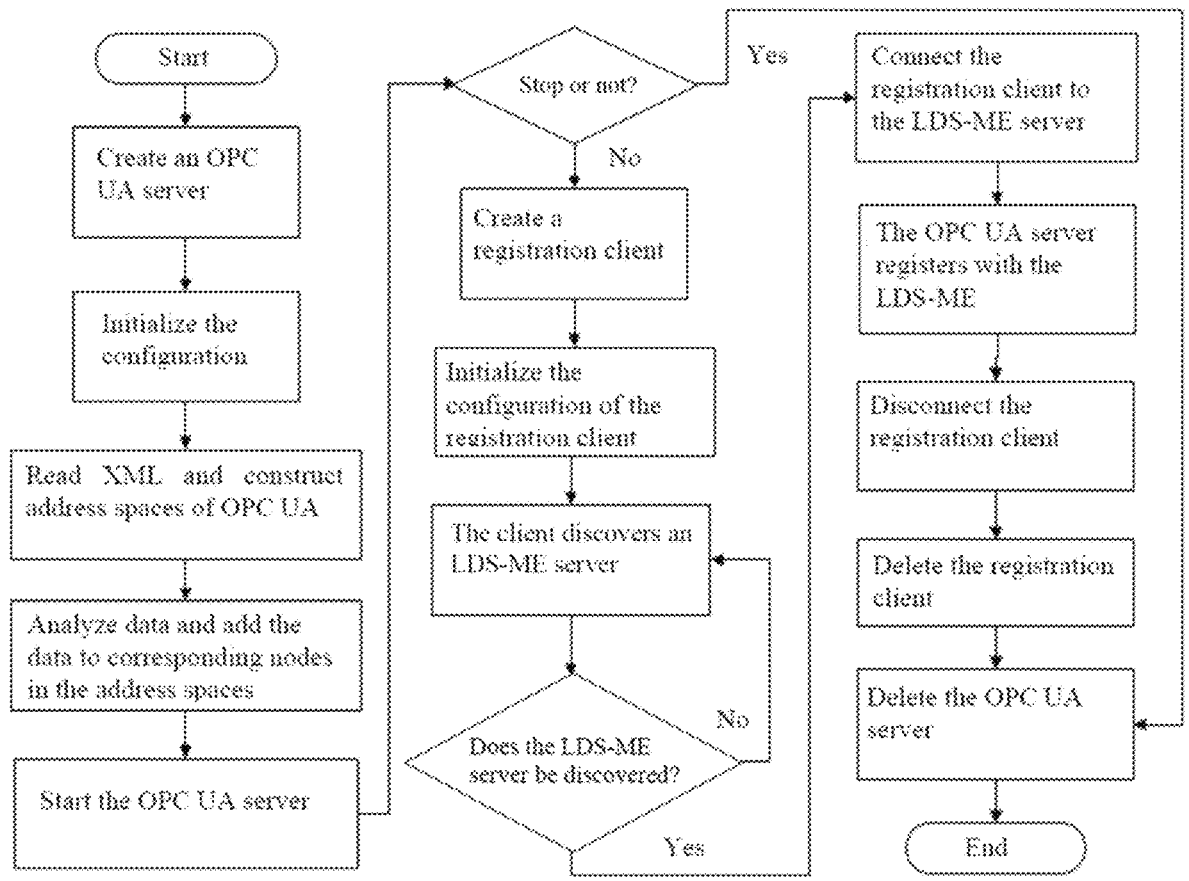
FIG. 6 is an operation flow chart of the embedded OPC UA servers according to an example of the present disclosure.

FIG. 6 is an operation flow chart of the embedded OPC UA servers according to an example of the present disclosure. As shown in FIG. 6, the process mainly includes the creation of an embedded OPC UA server, the creation of a first registration client, the registration of the OPC UA server with an LDS-ME server, the disconnection of the first registration client, the deletion of the first registration client and the deletion of the embedded OPC UA server. In the operation process, the OPC UA server needs to be created and the configuration of the embedded OPC UA server is initialized. After the configuration, XML files are read to construct address spaces of OPC UA. The data information is analyzed, and the analyzed data information is added to corresponding nodes of the address spaces. At this time, the embedded OPC UA server is started, and after the start, whether the embedded OPC UA server needs to be stopped is determined in real time. If so, the embedded OPC UA server is directly deleted; and if not, the first registration client needs to be created and configured, and the first registration client starts corresponding instructions to query and discover an LDS-ME server. If the LDS-ME server is discovered, the first registration client establishes a connection to the LDS-ME server. At this time, the embedded OPC UA server registers with the LDS-ME server through the first registration client. After the embedded OPC UA server registers with the LDS-ME server, the first registration client is disconnected from the LDS-ME server, the first registration client is deleted in the embedded OPC UA server, and finally the embedded OPC UA server is deleted.

At 103: a UA-TSN configuration management middleware communicates with the UA-TSN coordinator to discover and obtain an address information list of all the embedded OPC UA servers in the user terminal station.

The communication between the UA-TSN configuration management middleware and the UA-TSN coordinator is that the communication between the UA-TSN configuration management middleware and the LDS-ME discovery server in the UA-TSN coordinator through a user device discovery module. FIG. 7 is a flow chart of a user device discovery module according to an example of the present disclosure. As shown in FIG. 7, the discovery process between the user device discovery module and the LDS-ME discovery server includes the following steps.

At 301: a second OPC UA server is created for a user device discovery module, the configuration is initialized to be capable of performing mDNS service, an application type and URL information of the second OPC UA server are set, a server port number is randomly allocated, and server information is added.

At 302: the second OPC UA server is started to wait for LDS multicast discovery, and a corresponding callback function is called when other new LDS-ME discovery server is discovered through mDNS multicast, to obtain URL information and port information of the new LDS-ME discovery server.

At 303: whether the new LDS-ME discovery server supports signature and encryption is checked, a function is called to generate a corresponding second registration client, and the second OPC UA server connects to and registers with the new LDS-ME discovery server.

In some preferred examples, the discovery process can also include step 304.

At 304: the user device discovery module discovers field devices in different user terminal stations, and obtain address information of embedded OPC UA servers in all field device users. The address information mainly consists of static IP addresses and standard OPC UA ports. The user device discovery module saves the obtained address information in a fixed list and maintains the OPC UA address information of all devices in the system. When the embedded OPC UA server needs to be connected, its address information is to be queried, and when the device is disconnected from the system, its corresponding information in the address information list is deleted.

Figure 8:
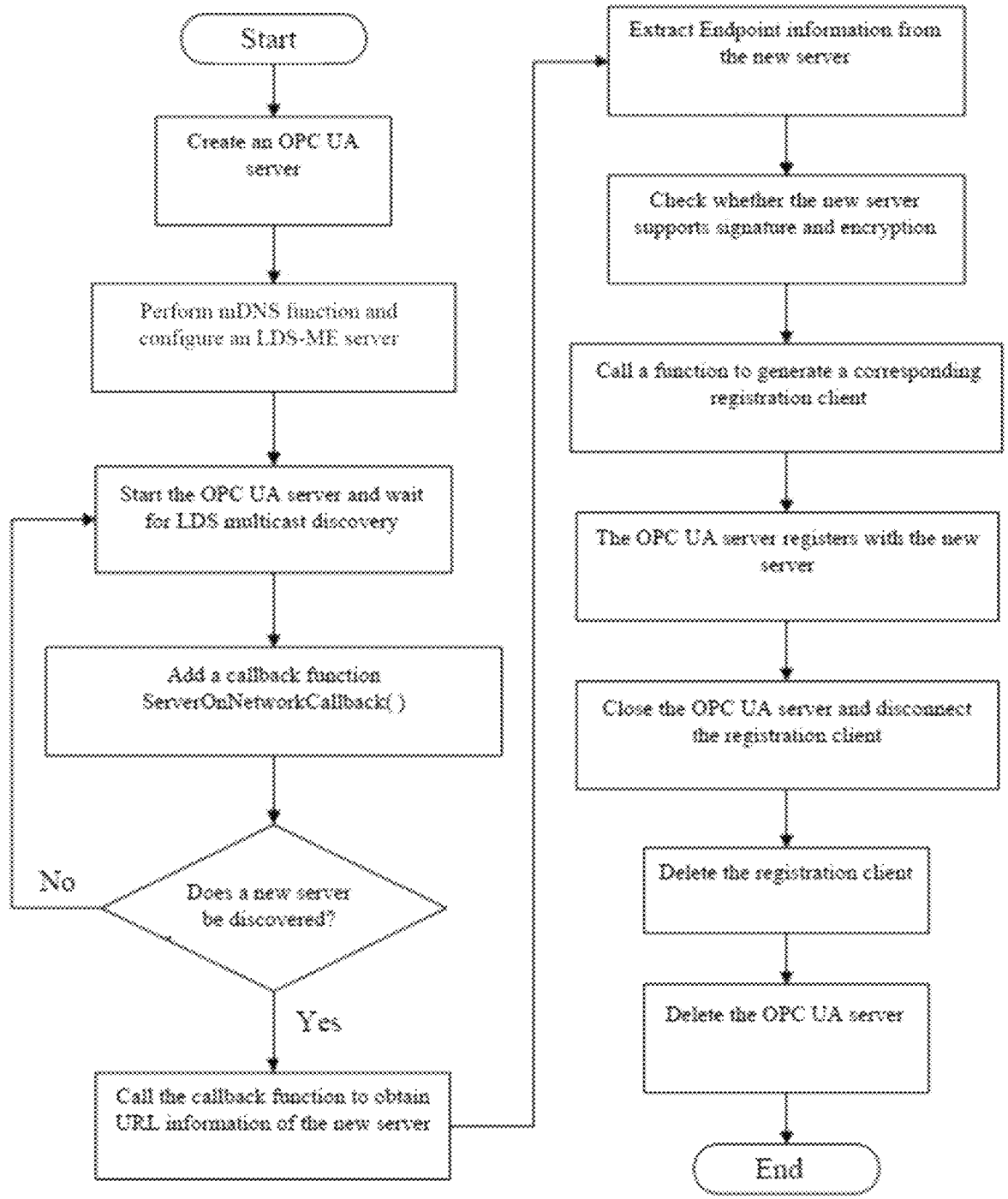
FIG. 8 is an operation flow chart of the user device discovery module according to an example of the present disclosure.

FIG. 8 is an operation flow chart of the user device discovery module according to an example of the present disclosure. As shown in FIG. 8, the process mainly includes the creation of a second OPC UA server, the creation of a second registration client, the disconnection of the second registration client, the deletion of the second registration client and the deletion of the second OPC UA server. In the operation process, the second OPC UA server needs to be created and the configuration of the second OPC UA server is initialized. After the configuration, mDNS service is performed to configure an LDS-ME server. The second OPC UA server is started, waiting for LDS multicast discovery, a callback function is added in the second OPC UA server, and whether other new LDS-ME discovery server is discovered is determined. If so, a callback function is called to obtain URL information and port information of the new LDS-ME discovery server. Whether the new LDS-ME discovery server supports signature and encryption is checked, and a function is called to generate a corresponding second registration client. The second OPC UA server is connected to and registers with the new LDS-ME discovery server. After the registration, the second OPC UA server is closed and disconnected from the second registration client, and the second OPC UA server is deleted after deleting the second registration client.

It can be understood that in the above examples, various functions can be realized with reference to the prior art, and corresponding functions can be set by those skilled in the art without creative efforts to realize corresponding functions.

At 104: the UA-TSN configuration management middleware connects to the field devices in the user terminal station according to the address information list, reads data information in the embedded OPC UA servers, and uniformly collects and manages all obtained data information.

Figure 9:
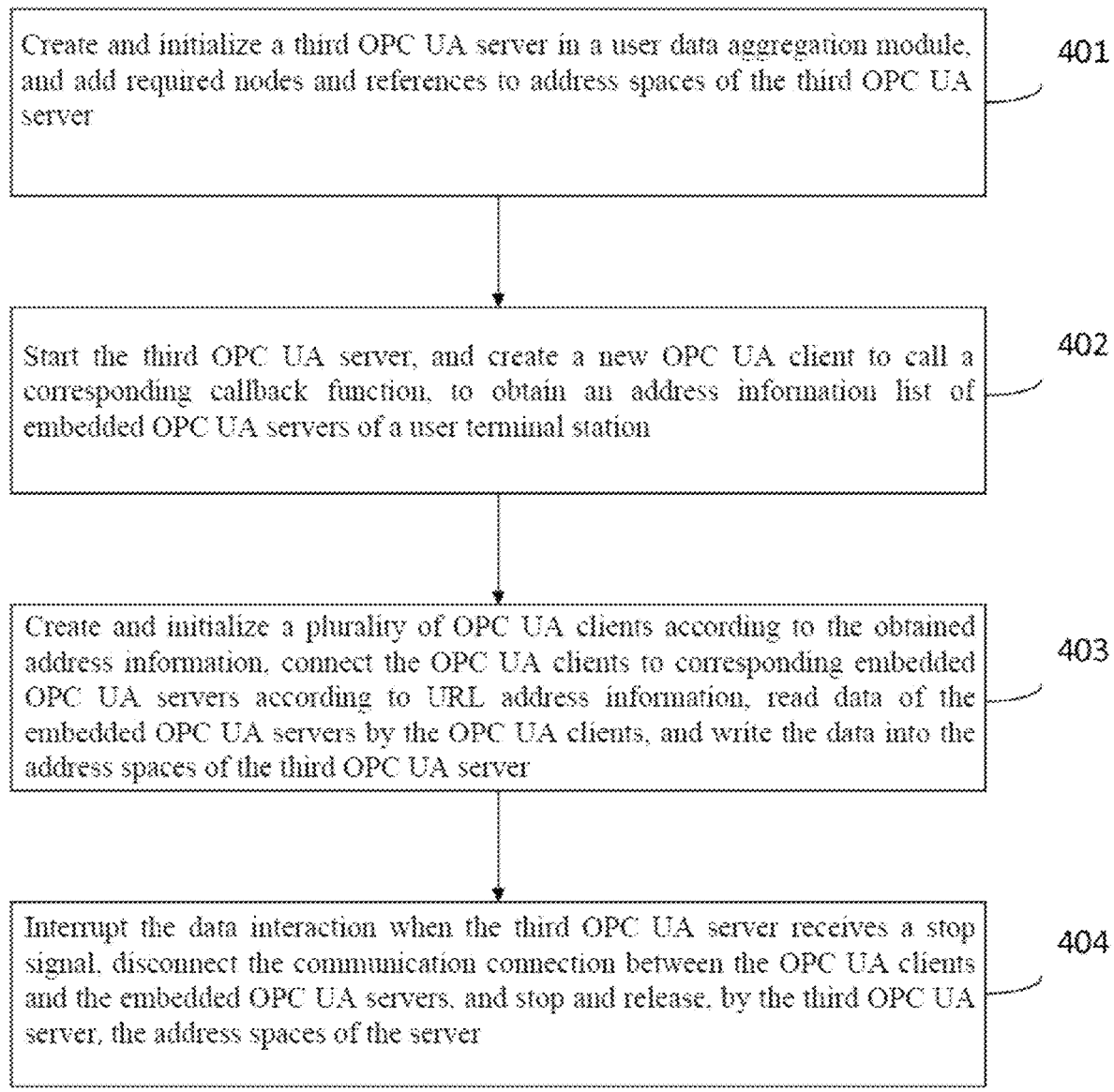
FIG. 9 is a communication flow chart of a user data aggregation module according to an example of the present disclosure.

The UA-TSN configuration management middleware connects to a plurality of field devices in the user terminal station by the communication between the embedded OPC UA servers of a user device through a user data aggregation module. FIG. 9 is a communication flow chart of a user data aggregation module according to an example of the present disclosure. As shown in FIG. 9, the communication process between the user data aggregation module and the embedded OPC UA servers includes the following steps.

At 401: a third OPC UA server is created and initialized in a user data aggregation module, and required nodes and references are added to address spaces of the third OPC UA server.

At 402: the third OPC UA server is started, and a new OPC UA client is created to call a corresponding callback function, to obtain an address information list of embedded OPC UA servers of a user terminal station.

At 403: a plurality of OPC UA clients are created and initialized according to the obtained address information, the OPC UA clients connects to corresponding embedded OPC UA servers according to URL address information, the OPC UA clients read data of the embedded OPC UA servers, and write the data into the address spaces of the third OPC UA server.

At 404: the data interaction is interrupted when the third OPC UA server receives a stop signal, the communication connection between the OPC UA clients and the embedded OPC UA servers is disconnected, and the third OPC UA server stops and releases the address spaces of the server.

Figure 10:
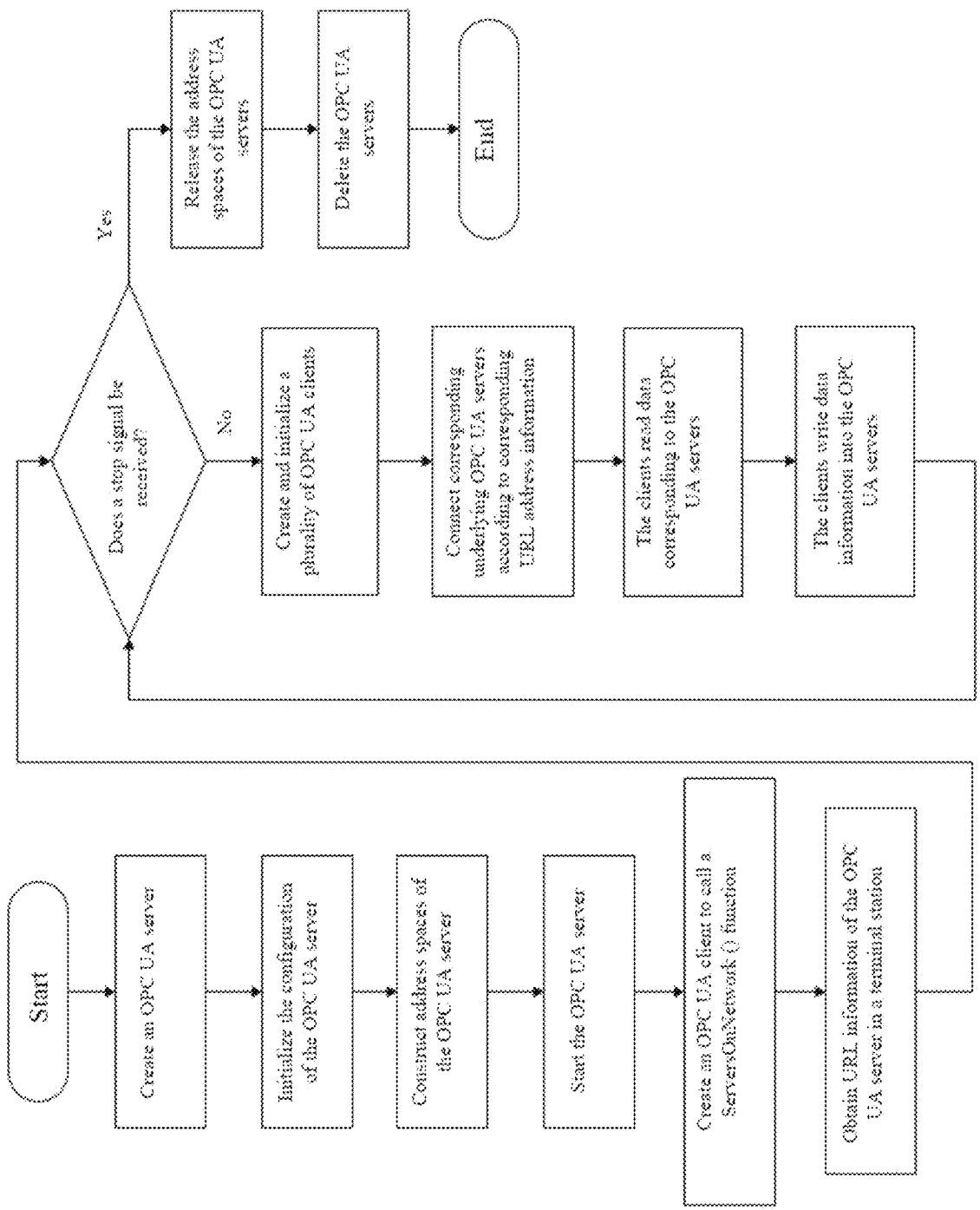
FIG. 10 is an operation flow chart of the user data aggregation module according to an example of the present disclosure.

FIG. 10 is an operation flow chart of the user data aggregation module according to an example of the present disclosure. As shown in FIG. 10, the process mainly includes the creation of a third OPC UA server, the creation of an OPC UA client, the disconnection of the OPC UA client, the deletion of the OPC UA client and the deletion of the third OPC UA server. In the operation process, the third OPC UA server needs to be created and configured, and after that, address spaces are constructed for the third OPC UA server. Then the third OPC UA server is started, and after the start, the OPC UA client is created, and a callback function is called to obtain URL information of the registered embedded OPC UA server in the user terminal station. Whether a stop signal is received is determined, if so, the address spaces of the third OPC UA server are released and the third OPC UA server is deleted; and if not, a plurality of OPC UA clients are created and initialized, and the corresponding embedded OPC UA servers are connected according to the corresponding URL address information, the OPC UA client reads the data of the corresponding embedded OPC UA server and writes the data information into the third OPC UA server, and whether the stop signal is received is continued to determine.

At 105: an OPC UA client in a centralized user configuration entity is initialized, then a connection establishment request to a UA-TSN message broker middleware is issued, TSN stream demands and network topology information stored in a user data aggregation module are read, and the read information is processed.

Figure 11:
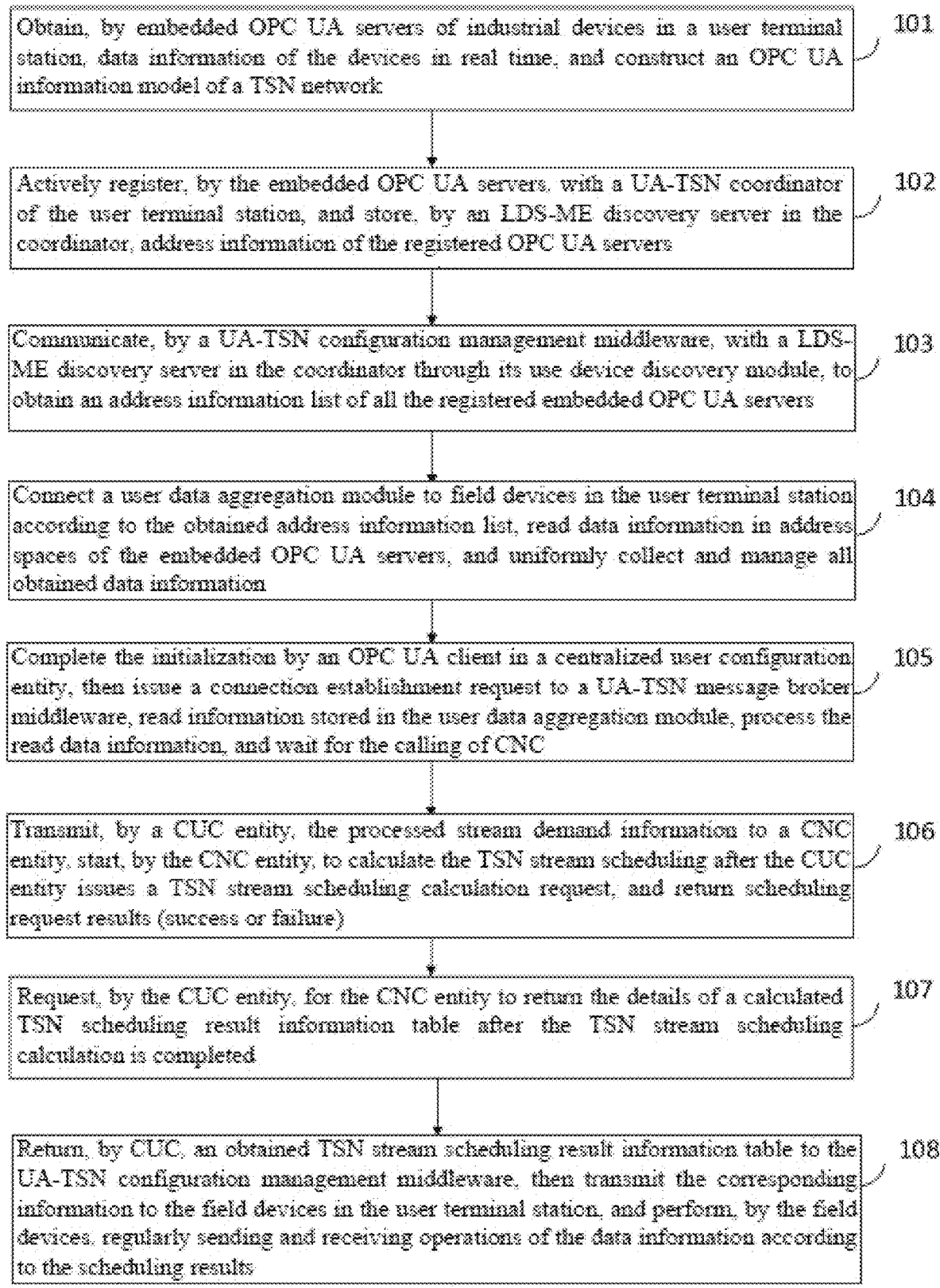
FIG. 11 is a flow chart of a preferred OPC UA-based centralized user configuration method for a time-sensitive network according to an example of the present disclosure.

In an example of the present disclosure, FIG. 11 is a flow chart of a preferred OPC UA-based centralized user configuration method for a time-sensitive network according to an example of the present disclosure. As shown in FIG. 11, the method includes the following steps.

At 101: embedded OPC UA servers of industrial devices in a user terminal station obtain data information of the devices in real time, and construct an OPC UA information model of a TSN network.

At 102: the embedded OPC UA servers actively register with a UA-TSN coordinator of the user terminal station, and an LDS-ME discovery server in the coordinator stores address information of the registered OPC UA servers.

At 103: a UA-TSN configuration management middleware communicates, through its use device discovery module, with the LDS-ME discovery server in the coordinator to obtain an address information list of all the registered embedded OPC UA servers.

At 104: a user data aggregation module connects to field devices in the user terminal station according to the obtained address information list, reads data information in address spaces of the embedded OPC UA servers, and uniformly collects and manages all obtained data information.

At 105: an OPC UA client in a centralized user configuration entity (CUC) is the initialized, then a connection establishment request to a UA-TSN message broker middleware is issued, TSN stream demands and network topology information stored in the user data aggregation module are read, the read information is further processed to wait for the calling by a centralized network configuration entity (CNC).

At 106: a CUC entity transmits the processed stream demand information to a CNC entity, the CNC entity performs TSN stream scheduling calculation after the CUC entity issues a TSN stream scheduling calculation request, and returns scheduling request results (success or failure).

At 107: the CUC entity requests for the CNC entity to return the details of a calculated TSN scheduling result information table after the TSN stream scheduling calculation. The information contains key information of TSN network configuration, such as stream identifiers, transmission windows and end-to-end delay.

At 108: CUC returns an obtained TSN stream scheduling result information table to the UA-TSN configuration management middleware, then transmits the corresponding information to the field devices in the user terminal station, and the field devices perform regularly sending and receiving operations of the data information according to the scheduling results.

Figure 12:
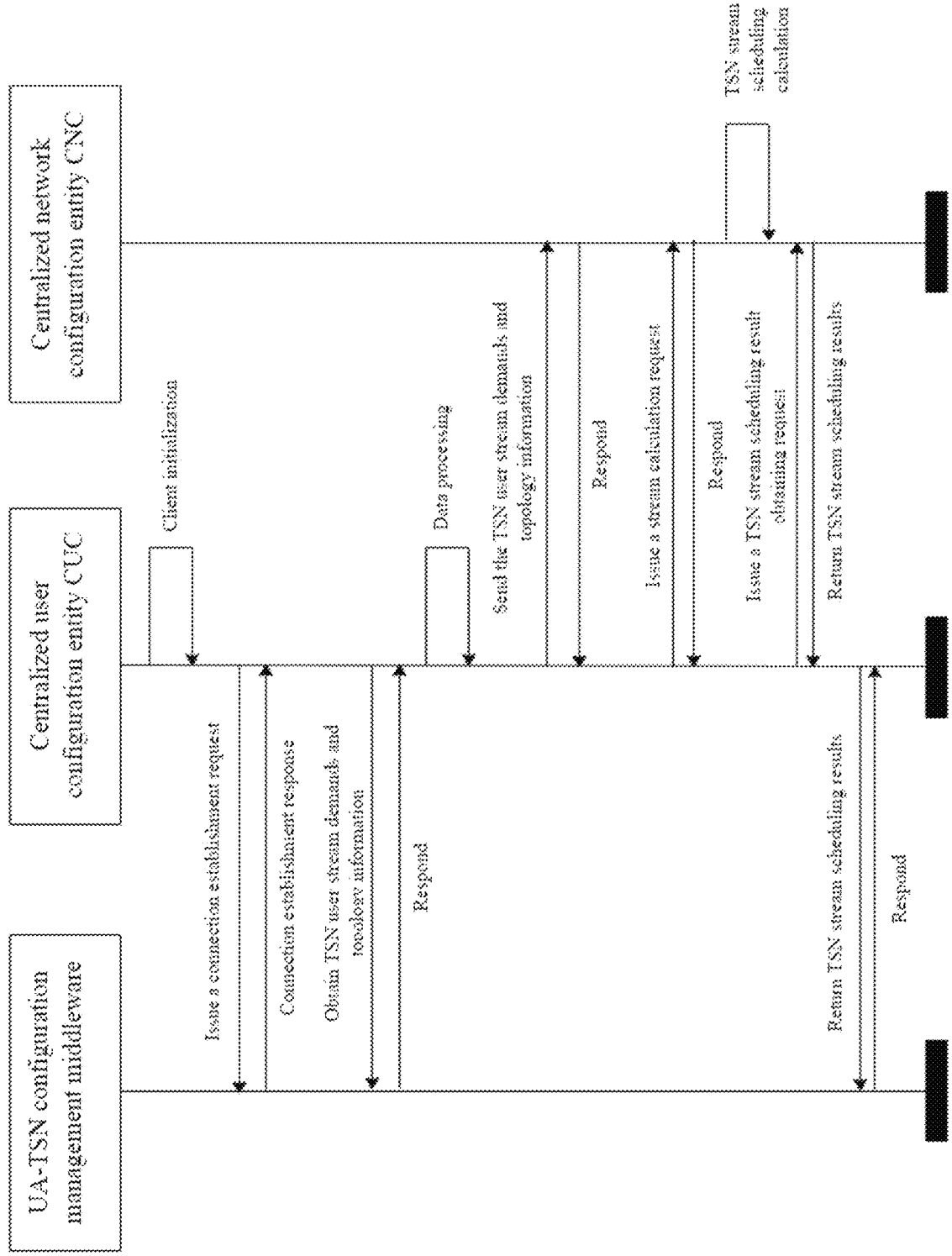
FIG. 12 is a time sequence flow chart executed by various entities according to the preferred example of the present disclosure.

FIG. 12 is a time sequence flow chart executed by various entities according to the preferred example of the present disclosure. As shown in FIG. 12, the CUC entity is mainly configured for the configuration and management of a user side in the TSN network, and the specific processes are as follows.

At a transmission stage of TSN user stream demand information, the initialized OPC UA client in CUC issues a connection establishment request, reads the stream demand and network topology information from a UA-TSN message broker middleware, and processes the obtained data and sends to the CNC entity.

At a return stage of TSN stream scheduling results: CUC entity sends a TSN stream scheduling calculation request to the CNC entity, and CNC will return the requested result (success or failure).

The CUC entity requests for the CNC entity to return a calculated scheduling result information table after the TSN stream scheduling calculation. The information contains key information of TSN network configuration, such as stream identifiers, transmission windows and end-to-end delay.

CUC returns the obtained TSN stream scheduling result information table to the UA-TSN configuration management middleware, then transmits the corresponding information to the field devices in the user terminal station, and the field devices perform regularly sending and receiving operations of the data information according to the scheduling results.

It can be understood that the OPC UA-based centralized user configuration method for a time-sensitive network and the OPC UA-based centralized user configuration system for a time-sensitive network of the present disclosure belong to the same concept of the present disclosure. Therefore, the features of the two can be mutually quoted, and are not described in the present disclosure.

In the description of the present disclosure, it is to be understood that the orientation or positional relationship indicated by the terms "coaxial", "bottom", "one end", "top", "middle", "other end","upper", "one side", "top", "inner", "outer", "front", "center" and "two ends" is based on that shown in the attached drawings and merely for the ease of describing the present disclosure and simplifying the description, rather than indicating or implying that the device or element referred to must be in a specific orientation, and constructed and operated in a specific orientation. Therefore, it is not to be understood as a limitation of the present disclosure.

In the present disclosure, unless otherwise expressly stated and limited, the terms "mounted", "arranged", "connected", "fixed", "rotate" are to be understood in a broad sense, for example, the "connected" may be fixedly connected, detachably connected, integrally connected, mechanically connected, electrically connected, directly connected, or indirectly connected through an intermediary, or a communication between two elements or an interaction between two elements. Unless otherwise explicitly defined, for those ordinarily skilled in the art, the specific meanings of the above terms in the present disclosure can be understood according to specific situations.

While examples of the present disclosure have been shown and described, it will be understood by those skilled in the art that various changes, modifications, substitutions and alterations may be made herein without departing from the principles and spirit of the present disclosure, the scope of which is defined by the appended claims and equivalents thereof.

The invention claimed is:

1. An open platform communications unified architecture (OPC UA)-based centralized user configuration system for a time-sensitive network, at least comprising user terminal stations, a unified architecture-time-sensitive network (UA-TSN) configuration management middleware and a centralized user configuration entity, the user terminal station comprising field devices adopting different industrial protocols and a UA-TSN coordinator, the UA-TSN configuration management middleware obtaining an OPC UA address information list by accessing the UA-TSN coordinator after embedded OPC UA servers of the field devices in the user terminal station actively register with the UA-TSN coordinator, the UA-TSN configuration management middleware communicating with the field devices in the user terminal station through corresponding OPC UA address information and collecting device information, the centralized user configuration entity extracting and analyzing time-sensitive network (TSN) stream demand information aggregated in the UA-TSN configuration management middleware, and the TSN stream demand information being scheduled and calculated to complete configuration, the process of the embedded OPC UA servers of the field devices in the user terminal station actively register with the UA-TSN coordinator comprising the following steps:

creating embedded OPC UA servers according to first registration information required by the embedded OPC UA servers, and initializing the configuration, defining an analytic function and a reading and writing method of data source information, and constructing address spaces of the embedded OPC UA servers according to the reading and writing method of data source information, calling the analytic function to process data, and adding the processed data information to nodes corresponding to the address spaces of the OPC UA servers, starting the embedded OPC UA servers to collect data information of the field devices, and calling the analytic function to obtain dynamic data of the field devices, creating a first registration client and initializing the configuration of the first registration client, and starting the first registration client and querying a local discovery server-multicast extension (LDS-ME) discovery server in the UA-TSN coordinator, and completing, by the embedded OPC UA servers, registration in the LDS-ME discovery server after the first registration client queries the LDS-ME discovery server.

2. The OPC UA-based centralized user configuration system for a time-sensitive network according to claim 1, wherein the UA-TSN configuration management middleware comprises a data management module, a data distribution and control module, a user data aggregation module and a user device discovery module, the data management module being configured to store the data information in the system and save the data information in a local database, the data distribution and control module being configured to distribute and control the OPC UA address information list, the TSN stream demand information and a scheduling result information table, the user data aggregation module being configured to connect the field devices and aggregate all device data into the address spaces of the servers, and the user device discovery module being configured to establish the connection to the discovery server in the UA-TSN coordinator and obtain the OPC UA address information list of the field devices.

3. The OPC UA-based centralized user configuration system for a time-sensitive network according to claim 1, wherein the centralized user configuration entity comprises an OPC UA client, a TSN scheduling control module, a management module and a communication interface, the OPC UA client being configured to communicate with the UA-TSN configuration management middleware to obtain integrated TSN stream demand information, the TSN scheduling control module being configured for the control of data stream transmission and configuration process, the management module being configured for information management, and the communication interface being configured to ensure the data interaction between the centralized user configuration entity and other external entities.

4. The OPC UA-based centralized user configuration system for a time-sensitive network according to claim 3, wherein the management module comprises a configuration state management unit, a user resource management unit and a network topology management unit, the user resource management unit and the network topology management unit being configured to manage the obtained corresponding TSN stream demand information, and the configuration state management unit being configured to distribute TSN user communication configuration results returned from the other external entities.

5. An open platform communications unified architecture (OPC UA)-based centralized user configuration method for a time-sensitive network, comprising the following steps:
obtaining, by embedded OPC UA servers of field devices in a user terminal station, data information of the field devices in real time, and constructing an OPC UA information model of a TSN network,
actively registering, by the embedded OPC UA servers, with a unified architecture-time-sensitive network (UA-TSN) coordinator of the user terminal station, and storing address information of the servers in the UA-TSN coordinator,
communicating, by a UA-TSN configuration management middleware, with the UA-TSN coordinator to discover and obtain an address information list of all registered embedded OPC UA servers in the user terminal station,
connecting the UA-TSN configuration management middleware to the field devices in the user terminal station according to the address information list, reading data information in the embedded OPC UA servers, and uniformly collecting and managing all obtained data information, and
completing, by a centralized user configuration entity, the initialization, then issuing a connection establishment request to a UA-TSN message broker middleware, reading TSN stream demands and network topology information stored in a user data aggregation module, and processing the read information,
the process of the actively registering, by the embedded OPC UA servers, with a UA-TSN coordinator of the user terminal station comprising the following steps:
creating embedded OPC UA servers according to first registration information required by the embedded OPC UA servers, and initializing the configuration,
defining an analytic function and a reading and writing method of data source information, and constructing address spaces of the embedded OPC UA servers according to the reading and writing method of data source information,
calling the analytic function to process data, and adding the processed data information to nodes corresponding to the address spaces of the OPC UA servers,
starting the embedded OPC UA servers to collect data information of the field devices, and calling the analytic function to obtain dynamic data of the field devices,
creating a first registration client and initializing the configuration of the first registration client, and
starting the first registration client and querying a local discovery server-multicast extension (LDS-ME) discovery server in the UA-TSN coordinator, and completing, by the embedded OPC UA servers, registration in the LDS-ME discovery server after the first registration client queries the LDS-ME discovery server.

6. The OPC UA-based centralized user configuration method for a time-sensitive network according to claim 5, wherein the constructing a n OPC UA information model of a TSN network comprises constructing a static data information model according to predefined Extensible Markup Language (XML) format documents or preset programs or/and binding the embedded OPC UA servers with real-time data source of the field devices, and calling a predefined function to write new data values to construct a dynamic data information model when real-time data source information changes dynamically.

7. The OPC UA-based centralized user configuration method for a time-sensitive network according to claim 5, wherein the communication between the UA-TSN configuration management middleware and the UA-TSN coordinator is that the communication between the UA-TSN configuration management middleware and the LDS-ME discovery server in the UA-TSN coordinator through a user device discovery module, the discovery process between the user device discovery module and the LDS-ME discovery server comprising the following steps:
creating a second OPC UA server for the user device discovery module, initializing the configuration, performing multicast domain name system (mDNS) service, setting an application type and URL information of the second OPC UA server, randomly allocating a server port number, and adding server information,
starting the second OPC UA server and waiting for LDS multicast discovery, and calling a corresponding callback function when other new LDS-ME discovery server is discovered through mDNS multicast, to obtain URL information and port information of the new LDS-ME discovery server, and
checking whether the new LDS-ME discovery server supports signature and encryption, calling a function to generate a corresponding second registration client, connecting the second OPC UA server to the new LDS-ME discovery server, and registering, by the second OPC UA server, with the new LDS-ME discovery server.

8. The OPC UA-based centralized user configuration method for a time-sensitive network according to claim 5, wherein the UA-TSN configuration management middleware is connected to a plurality of field devices in the user terminal station and communicated with embedded OPC UA servers of a user device through the user data aggregation module, the communication process between the user data aggregation module and the embedded OPC UA servers comprising the following steps:

creating and initializing a third OPC UA server in the user data aggregation module, and adding required nodes and references to address spaces of the third OPC UA server;

starting the third OPC UA server, and creating a new OPC UA client to call a corresponding callback function, to obtain an address information list of the embedded OPC UA servers of the user terminal station;

creating and initializing a plurality of OPC UA clients according to the obtained address information, connecting the OPC UA clients to corresponding embedded OPC UA servers according to URL address information, reading, by the OPC UA clients, data of the embedded OPC UA servers, and writing the data into the address spaces of the third OPC UA server; and interrupting the data interaction when the third OPC UA server receives a stop signal, disconnecting the communication connection between the OPC UA clients and the embedded OPC UA servers, and stopping the third OPC UA server and releasing the address spaces of the server.

* * * * *